(12) United States Patent
Wang et al.

(10) Patent No.: US 7,610,513 B2
(45) Date of Patent: Oct. 27, 2009

(54) DEBUG DEVICE FOR DETECTING BUS TRANSMISSION AND METHOD THEREOF

(75) Inventors: Jing-Rung Wang, Taipei (TW); Janq-Lih Hsieh, Taipei (TW)

(73) Assignee: Via Technologies, Inc., Taipei (TW)

( * ) Notice: Subject to any disclaimer, the term of this patent is extended or adjusted under 35 U.S.C. 154(b) by 390 days.

(21) Appl. No.: 11/608,601

(22) Filed: Dec. 8, 2006

(65) Prior Publication Data

US 2007/0294055 A1 Dec. 20, 2007

(30) Foreign Application Priority Data

Jun. 16, 2006 (TW) .............................. 95121671 A

(51) Int. Cl.
*G06F 11/00* (2006.01)
(52) U.S. Cl. ....................................................... 714/27
(58) Field of Classification Search .................. 714/43, 714/27
See application file for complete search history.

(56) References Cited

U.S. PATENT DOCUMENTS

| | | | | |
|---|---|---|---|---|
| 4,280,285 A | * | 7/1981 | Haas | 434/30 |
| 6,922,821 B1 | * | 7/2005 | Nemecek | 716/4 |
| 7,444,499 B2 | * | 10/2008 | Davis et al. | 712/227 |
| 2002/0178320 A1 | * | 11/2002 | Wu | 710/306 |
| 2004/0153811 A1 | * | 8/2004 | Kuo | 714/36 |
| 2004/0177340 A1 | * | 9/2004 | Hsu et al. | 717/120 |
| 2008/0148104 A1 | * | 6/2008 | Brinkman et al. | 714/43 |
| 2009/0157945 A1 | * | 6/2009 | Arimilli et al. | 711/100 |

* cited by examiner

*Primary Examiner*—Scott T Baderman
*Assistant Examiner*—Yair Leibovich
(74) *Attorney, Agent, or Firm*—Thomas, Kayden, Horstemeyer & Risley

(57) ABSTRACT

This invention relates to a debug device and method thereof and is applied to detect transmission on a bus in a computer system having a CPU, a north bridge chip and a south bridge chip. The debug device consists of a processing unit, a comparing unit and a recording unit. The processing unit receives a first address signal and a second address signal from the north bridge chip, and correspondingly transmits an index signal and a test data to the north bridge chip. The comparing unit compares the first and the second address signal to generate a comparing signal. And the recording unit records the first and the second address signal and the comparing signal. The north bridge chip connects to the south bridge chip via a bus, and the debug device also connects to the south bridge chip. Therefore the north bridge chip and the debug device transmit to both through the south chip.

20 Claims, 2 Drawing Sheets

DEBUG DEVICE FOR DETECTING BUS TRANSMISSION AND METHOD THEREOF

FIELD OF INVENTION

This invention relates to a debug device and method thereof, and is applied to detect bus transmission in a computer system.

BACKGROUND

As the globalization of the technology industry moves forward, the level of consumer products goes further faster. The blooming of technology attracts more and more companies devoting in the industry. Each company may adopt different standards in products of the same kind, resulting the problem of integration of various standards. For example, one can choose hardware equipments by preferred needs to construct a personal computer. But those hardware equipments have to be compatible in between, otherwise the computer may not function normally. Once an equipment is replaced by a different standard one, other equipments correlative to that may have to change correspondingly. This can be an inconvenient and wasteful work to do.

Take an example, the central processing unit (CPU) and the motherboard communicate with each other through the north bridge chip and the south bridge chip. The north bridge chip communicates with the CPU and transfers signals to the south bridge chip via a bus, then the south bridge chip transfers these signals to the external hardware equipments. If one wants to change a new CPU, the choice should be a CPU compatible with the motherboard. But even the new one is compatible with the motherboard, it does not guarantee the computer system could work as well. The reason is that the booting procedure of a computer system is a series of processes. The main process is fetching relative setups in the basic input output system (BIOS) via the bus between the north bridge and the south bridge chips. To make sure the computer system can function well, the bus between the north bridge chip and the south bridge chip should be able to transfer data stably. But changing the CPU may affect the original setups in the BIOS. Furthermore, those setups are transferred via the bus between the north bridge chip and the south bridge chip. To ensure the stability of the bus transmission, manufacturer would do every possible test preventing the problem of disfunction due to equipment change.

Currently, measurement of bus testing is done by manual operation with measuring equipments. To gain an optimal result in manual way, the designer has to repeat the procedures of modifying variables, operating test, observing and recording every outcome by ones own. This can be exhaustive and more importantly, lack of efficiency and accuracy.

SUMMARY OF THE INVENTION

This invention provides a debug device for detecting a bus transmission in a computer system and a method therefore. The proper transmission range of the bus can be detected automatically and the testing accuracy can be improved in this invention. The performance of the computer system is stabilized and has the benefit of reducing labor effort and time wasted.

The debug device for detecting bus transmission of a computer consists of a processing unit, a comparing unit and a recording unit. The computer system consists of a CPU, a north bridge chip and a south bridge chip. The CPU is connected to the north bridge chip via a front side bus (FSB); the north bridge chip is connected to the south bridge chip via a link bus; and the south bridge chip is connected to the debug device via a peripheral component interconnect (PCI) bus. The processing unit of the debug device receives a first address signal and a second address signal from the north bridge chip, and feedbacks an index signal and a test data to the north bridge chip. The comparing unit compares the first address signal and the second address signal to generate a comparing signal. The recording unit records the first address signal, the second address signal and the comparing signal. The processing unit also issues a retry signal to the CPU, forcing the CPU to issue a booting signal to the north bridge chip. In responding, the north bridge chip again delivers another first address signal to the debug device.

This invention also provides a debug method applied to detect bus transmission of a computer system. By using this method, the computer system may automatically detect a stable range to avoid improper adjustment and setups. The method includes the steps of: delivering a first address signal from the north bridge chip to the debug device; delivering an index signal according to the first address signal from the debug device to the north bridge chip; delivering a second address signal corresponding to the index signal from the north bridge chip to the debug device; delivering a test data from the debug device to the north bridge chip, and generating a comparing signal based on the first address signal and the second address signal and recording the comparing signal, the first address signal and the second address signal. Furthermore, after the north bridge chip receives the test data, the debug device issues a retry signal to the CPU. The north bridge chip again delivers a first address signal to the debug device, and so on. The method of this invention provides the functionality of automatic scanning certain test range and stability testing.

DETAILED DESCRIPTION

In the normal start up process, the CPU fetches a dialog session initiation protocol (SIP) from a boot initial address in the basic input output system (BIOS) to obtain necessary initial setup values. However, these initial setup values are written by the system designer. Therefore, the system designer has to test the optimal values and its stable range before the computer works. As stated in the prior art, manual testing is operated by repeatedly writing a test value each time to obtain the optimal result. This invention utilizes a debug device to automatically test series of values in a certain or random range by the computer system, and writes the best optimal setup values in the BIOS.

Figure 1:
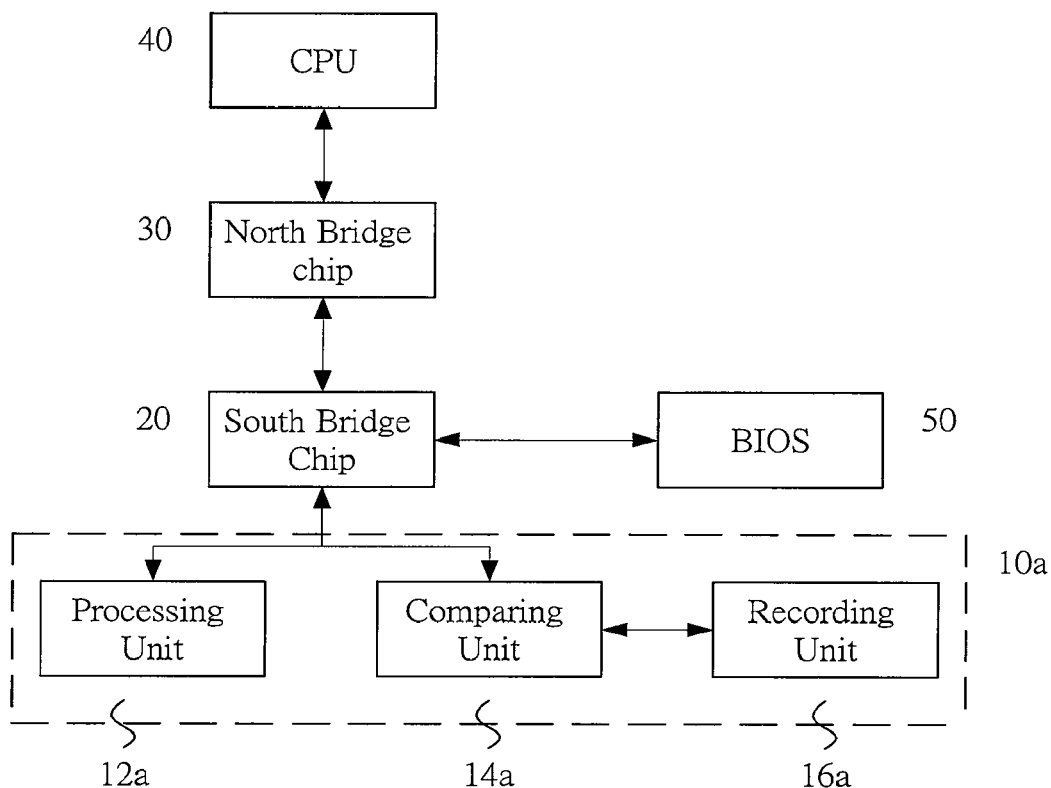
FIG. 1 illustrates a block diagram of a preferred embodiment.

Please refer to FIG. 1, which depicts a block diagram of a preferred embodiment of this invention. The debug device 10a of this invention includes a processing unit 12a, a comparing unit 14a and a recording unit 16a. The debug device 10a is connected to a south bridge chip 20 via a peripheral component interface (PCI) bus. The south bridge chip 20 is connected to a north bridge chip 30 via a link. The north bridge chip 30 is connected to the CPU 40 via a front side bus (FSB). The south bridge 30 is further connected to a BIOS 50 via a low pin count (LPC) bus.

The operation of the debug device 10a stimulates the data transmission flow after the computer system has started up. Instead of fetching data from the BIOS 50 to the CPU 40, data is synthesized by the debug device 10a and transmitted to the north bridge chip 30 through the south bridge chip 20. When the computer system is powered on, the CPU 40 generates a booting signal and delivers it to the north bridge chip 30 via the FSB. The north bridge chip 30 blocks the booting signal to stop the booting signal being delivered to the BIOS 50. Later the north bridge chip 30 generates a first address signal and delivers the first address signal to the south bridge chip 20 via the link bus. In the prior art system, the south bridge chip 20 should deliver the first address signal to the BIOS 50 for accessing corresponding initial data. Instead, the debug device 10a of this invention intercepts the first address signal that should be delivered to the BIOS 50 via the PCI bus. As a result, the BIOS 50 will not perform any function. The debug device 10a then provides the first address signal to the recording unit 12a and the comparing unit 14a for further operations.

After receiving the first address signal, the processing unit 12a generates a corresponding index signal and delivers it to the north bridge chip 30 through the south bridge chip 20. The north bridge chip 30 as well generates a second address signal corresponding to the index signal and delivers it to the debug device 10a through the south bridge chip 20. The debug device 10a will deliver a test data to the north bridge chip 30 after receiving the second address signal. The test data can be generated in random or specific way. The comparing unit 14a generates a comparing signal according to the first address signal and the second address signal. Then the recording unit 16a records the first address signal, the second address signal and the comparing signal.

The debug device 10a also issues a retry signal to the CPU 40 after receiving the second address signal. The CPU 40 then issues a booting signal to the north bridge chip 30 again, making the north bridge chip 30 generates another first address signal. The procedure repeats above mentioned processes as a complete cycle. The north bridge chip 30 will issue a retry signal to the CPU 40 as a response to show that the booting signal is invalid. The CPU 40 then issues another booting signal, and the north bridge chip 30 again responses another retry signal. In this fashion, the north bridge chip 30 successfully blocks the access of the CPU 40 to the BIOS 50 and delivers the address signals to the debug device 10a for detection.

The debug device 10a may deliver different address signals to the north bridge chip 30, for example a serious of continuous address signals. Also, the debug device 10a can scan addresses in the whole region or a specific one to detect at which address transmission error may occur, such as transmission interrupt. Furthermore, the debug device 10a may compare and record each signal, even output these signals to display on the screen during detection. Therefore, the system designer may observe variations of each signal to gain more understanding about the bus transmission between the north bridge chip 30 and the south bridge chip 20. The recorded values in the recording unit 16a may inform system designer at which address the error occurs, and be a reference for future design.

Except getting error information from different address signals, it can also be performed by generating test data in specific order, such as sequentially changing value of certain bits. Variations of data bits can test the sensitivity which may also influence the stability of bus transmission. The system designer may modify errors on bit change to improve the performance of the link bus.

Figure 2:
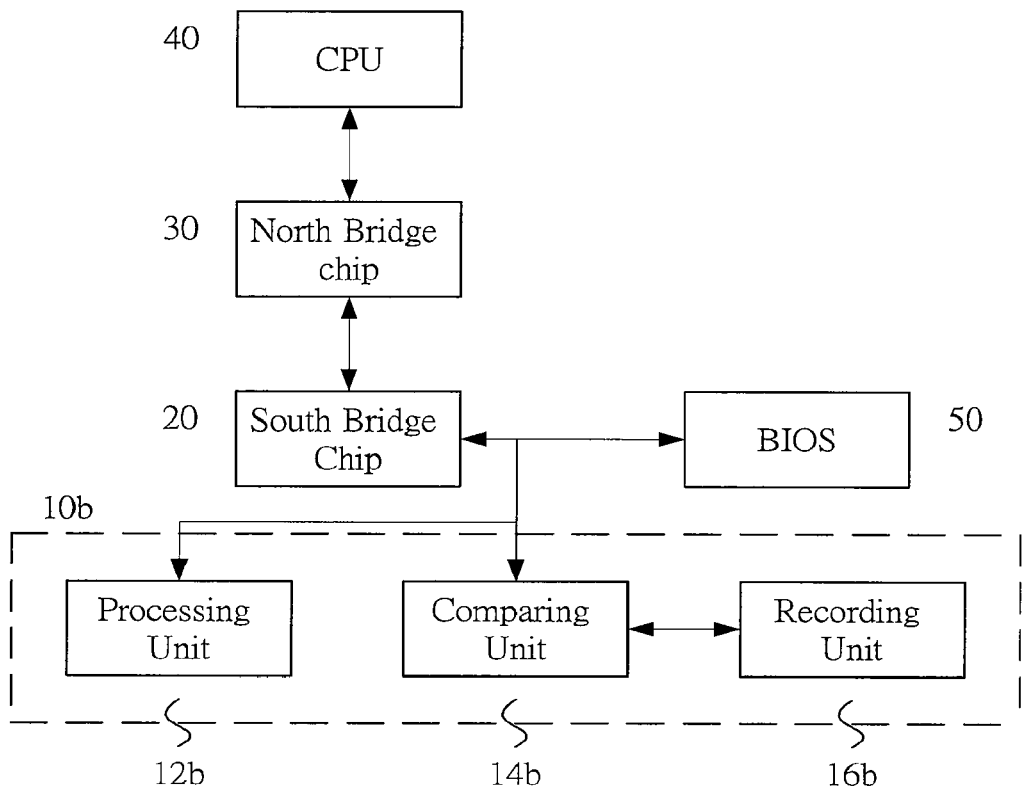
FIG. 2 illustrates a block diagram of another preferred embodiment.

FIG. 2 depicts a block diagram of another embodiment of the debug device. As shown in FIG. 2, the debug device 10b includes a processing unit 12b, a comparing unit 14a and a recording unit 16b. The computer system in FIG. 2, same as that in FIG. 1, includes a CPU 40, a north bridge chip 30 and a south bridge chip 20. The CPU 40 and the north bridge chip 30 are connected to each other via a FSB; the north bridge chip 30 and the south bridge chip 20 are connected via a link bus. But differs to FIG. 1, the debug device 10b is connected to the south bridge chip 20 via a LPC bus as well as the BIOS 50. Therefore, the debug device 10b may intercept signals from the south bridge chip 20, preventing the BIOS 50 from receiving or feeding back signals to the north bridge chip 30. The operation of this embodiment is the same as that of FIG. 1. The north bridge chip 30 blocks a booting signal from the CPU 40 and delivers a first address signal to the debug device 10b. Then the debug device 10b returns an index signal to the north bridge chip 30. The north bridge chip 30 again transmits a second address signal to the debug device 10b in reply to the index signal. The debug device 10b then transmits a test data to the north bridge chip 30 and issues a retry signal to the CPU 40. Except that the debug device 10b is connected to the south bridge chip 20 via the LPC bus, other details are same as described in the previous embodiment and will not be repeated here. Please refer to the above description for better understanding.

Figure 3:
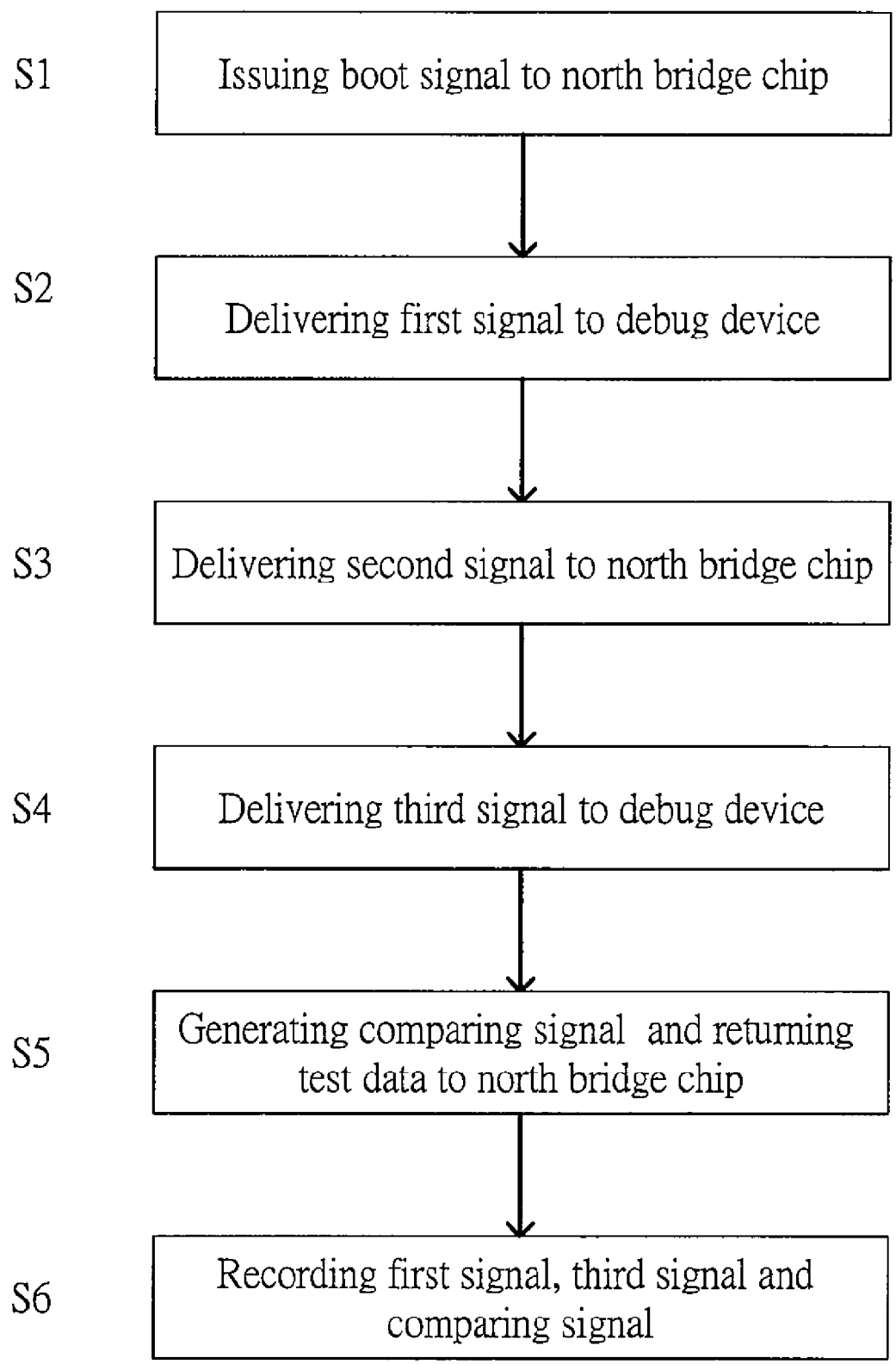
FIG. 3 illustrates a flowchart of a preferred embodiment.

A flowchart of a preferred embodiment is illustrated in FIG. 3. Please refer with FIG. 1. First in step S1, issue a booting signal from the CPU 40 to the north bridge chip 30. In step S2, block the booting signal and deliver a first signal from the north bridge chip 30 to the debug device 10a. In step S3, deliver a second signal from the debug device 10a to the north bridge chip 30 according to the first signal. In step S4, deliver a third signal from the north bridge chip 30 to the debug device according to the second signal. In step S5, generate a comparing signal according to the first signal and the third signal, and return a test data from the debug device 10a to the north bridge chip 30. In the final step S6, record the first signal, the third signal and the comparing signal, and issue a retry signal to the CPU 40. In step S2 to step S6, the north bridge chip 30 and the debug device 10a transfer signals and data to each other through the south bridge chip 20. The test result of this embodiment may be applied to improve the stability of bus transmission between the north bridge chip 30 and the south bridge chip 20 of the computer system, and also be applied as initial setup reference.

Concluded from above, this invention provides a debug device and a method therefore by connecting a debug device to the PCI bus or a LPC bus, even dispose the debug device in the BIOS, to block the CPU accessing data from the BIOS. The present invention is also applied to transfer address signals and test data between the north bridge chip and the debug device for detecting bus transmission between the north bridge chip and the south bridge chip. This invention has the advantage of saving labor effort and time spent by automatic scan. Efficiency and accuracy can be improved greatly, and the purpose of obtaining the optimal setup of the computer system may be easily achieved.

Please note that the embodiments disclosed herein are not referred to limit the scope of this invention. Other embodiments with equivalent variations or modification on shape, construction or features are taken as part of the present invention. The scope of the present invention is determined by the following claims.

What is claimed is:

1. A debug device for detecting transmission on a bus, coupled to a computer system comprising a CPU, a north bridge chip, a south bridge chip, wherein said north bridge chip and said south bridge chip are connected through said bus, the debug device comprises:

a processing unit, for receiving a first address signal and a second address signal from said north bridge chip and generating an index signal according to said first address signal and delivering said index signal and a test data to said north bridge chip;

a comparing unit, for comparing said first address signal and said second address signal to generate a comparing signal; and a recording unit, for recording said first address signal, said second address signal and said comparing signal, wherein said second address signal is generated by said north bridge chip according to said index signal when receiving said index signal.

2. The debug device according to claim 1, wherein said first address signal and said second address signal are delivered to said processing unit through said south bridge chip; said index signal and said test data are delivered to said north bridge chip through said south bridge chip.

3. The debug device according to claim 2, wherein said debug device is connected to said south bridge chip via a PCI bus or a LPC bus.

4. The debug device according to claim 1, wherein said processing unit generates said test data according to said second address signal.

5. The debug device according to claim 1, wherein said north bridge confirms said test data is received.

6. The debug device according to claim 1, wherein said test data is generated in random or a specific way.

7. A detection method for detecting transmission on a bus, said computer system comprises a CPU, a north bridge chip and a south bridge chip, wherein said north bridge chip and said south bridge chip are connected through said bus, the detection method comprising:

delivering a first address signal from said north bridge chip to said debug device;

generating an index signal according to said first address signal and delivering said index signal from said debug device to said north bridge chip;

delivering a second address signal from said north bridge chip to said debug device;

delivering a test data from said debug device to said north bridge chip;

generating a comparing signal according to said first address signal and said second address signal by said debug device; and issuing a retry signal from said debug device to said CPU;

wherein said second address signal is generated by said north bridge chip according to said index signal when receiving said index signal.

8. The detection method according to claim 7, wherein said first address signal, said second address signal, said index signal and said test data are transmitted between said north bridge chip and said debug device through said south bridge chip.

9. The detection method according to claim 7, wherein said debug device is connected to said south bridge chip via a PCI bus or a LPC bus.

10. The detection method according to claim 7, said step of delivering said first address signal from said north bridge chip to said debug device comprising: issuing a booting signal from said CPU to said north bridge chip.

11. The detection method according to claim 10, wherein said retry signal enforces said CPU issuing said booting signal.

12. The detection method according to claim 7, said step of generating a comparing signal according to said first address signal and said second address signal by said debug device comprising: recording said first address signal, said second address signal and said comparing signal.

13. The detection method according to claim 7, wherein said first address signal, said second address signal and said comparing signal may be generated in monotonic series.

14. The detection method according to claim 7, said step of delivering said test data from said debug device to said north bridge chip comprising: confirming said data is received by said north bridge chip.

15. The detection method according to claim 7, wherein said test data is generated in random or a specific way.

16. The debug device according to claim 1, wherein said processing unit issues a retry signal to said CPU, and said CPU issuing a booting signal to said north bridge chip, said north bridge chip issuing another first address signal to the processing unit.

17. The debug device according to claim 16, wherein said processing unit generates another index signal according to said another first address signal, and delivers said another index signal to said north bridge chip to detect at which index signal an error occurs.

18. The detection method according to claim 7, wherein when receiving said retry signal, said CPU issuing a booting signal to said north bridge chip, said north bridge chip issuing another first address signal to the processing unit to repeat the detection method as a cycle.

19. The detection method according to claim 18, wherein said processing unit delivers different index signals to said north bridge chip to detect at which index signal an error occurs.

20. The detection method according to claim 19, wherein said different index signals are a series of continuous address signals, and said processing unit detects at which address signal an error occurs.

* * * * *